April 7, 1942.  A. C. KRACKLAUER  2,278,453
PLATE FILTER
Filed June 5, 1939
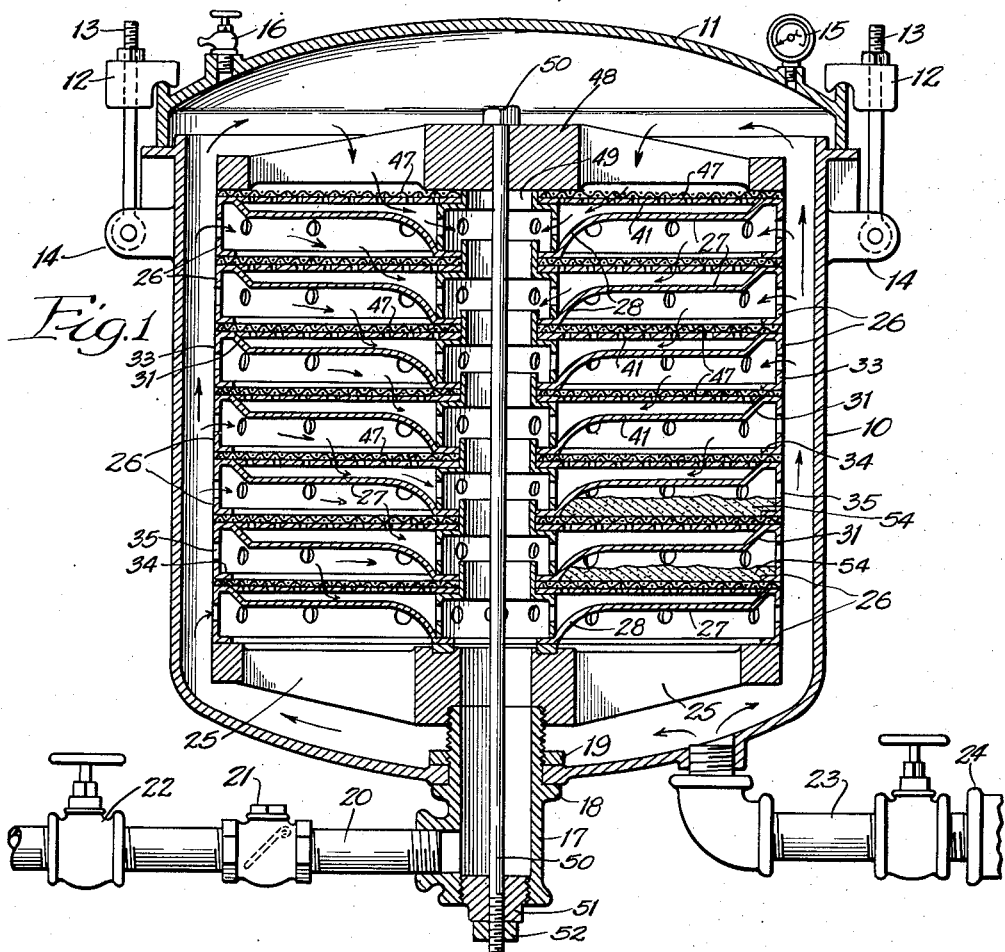
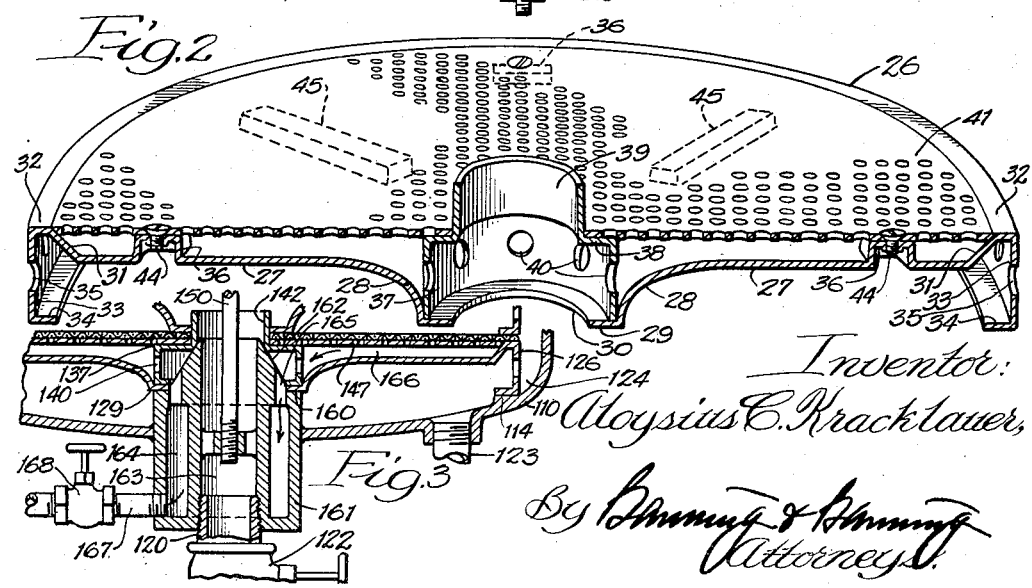
Inventor:
Aloysius C. Kracklauer,
By Schmidt & Schmidt
Attorneys

Patented Apr. 7, 1942

2,278,453

UNITED STATES PATENT OFFICE 2,278,453

PLATE FILTER

Aloysius C. Kracklauer, Chicago, Ill., assignor to Sparkler Manufacturing Company, Mundelein, Ill., a copartnership composed of William J. Kracklauer, Violet Kracklauer and Aloysius C. Kracklauer Application June 5, 1939, Serial No. 277,403

10 Claims. (Cl. 210—178)

An object of this invention is to provide a simple and efficient apparatus for filtering various liquids such as varnishes, wines, syrups, oils and the like, and particularly such an apparatus as will greatly increase the rate and efficiency of filtration.

Another object is the provision of a plate filter which is simple and inexpensive to construct and easy to assemble, disassemble and clean.

Still another object is the provision of means for filtering the residue heretofore left in the filter at the end of a run.

These and other objects, as will hereinafter appear, are accomplished by this invention which is fully described in the following specification and shown in the accompanying drawing in which:

Figure 1 is a vertical section through a plate filter embodying the invention;

Fig. 2 is a sectional perspective view of one of the filter frames; and

Fig. 3 is a fragmentary vertical section showing a filtering apparatus of modified construction.

The embodiment illustrated in Figs. 1 and 2 comprises a tank 10 upon which is tightly fitted a lid 11 which is secured in place by means of clips 12 and bolts 13 hingedly mounted on lugs 14. This lid may carry a pressure gauge 15 and, if desired, be equipped with a petcock 16 for releasing air from the casing as liquid enters therein.

The tank, preferably circular in form, may be supported in any desired manner, not shown, and has a fitting 17 passing through a central hole in the bottom with a flange 18 against which the tank is tightly pressed by means of a nut 19 on the threaded upper end of the fitting. This fitting, as will presently be seen, forms part of the outlet passage and is provided with a pipe 20, a check valve 21 and globe valve 22 for controlling the outflow of filtered liquid. Liquid to be filtered enters the filter through a pipe 23 under pressure from a pump 24.

A spider 25 having a center opening threaded to match the thread on the upper end of the fitting 17 is screwed thereon and serves to support horizontally a number of filter frames 26 comprising (a) an imperforate plate, (b) a hub, and (c) a perforated plate, shown in assembled relation in Fig. 2. The imperforate plate 27 is preferably circular and curved downwardly at 28 to form a flat bearing surface or ring 29 surrounding a central opening 30. Near its outer periphery the plate is inclined upwardly at 31, and then turns outwardly to form a flat bearing surface 32, and then downwardly to form an outer apron 33 having a lower bearing surface in the form of an inwardly turned flange 34. The apron has a series of holes 35 and the plate is provided with a number of bosses 36, the purpose of which will presently be explained. The bottoms of the flat bearing surfaces 29 and 34 are preferably in the same plane.

The hub 37 which is tubular bears upon the upper surface of the ring 29 where it is positioned by the upwardly curved portion 28 of the plate. This hub has an inwardly extending ledge 38 and terminates in a reduced upwardly extending tube 39 which is of a size to fit the opening 30 of the next higher filter frame. The hub 37 is provided with a number of holes 40 for the passage of filtered liquid.

The perforated plate 41, preferably made of a perforated sheet metal, has a central opening which just fits over the tube 39 and rests upon the ledge 38. It also rests upon the bosses 36 and is secured thereto by means of screws 44, the outer edge of the screen being fitted upon the inclined upper surface 31. The upper surface of the plate 41 is preferably in the plane of the bearing surface 32. A number of spacers 45 are placed between the imperforate plate 27 and the perforated plate 41 to support the latter against the pressure of the liquid which is being filtered.

A filter sheet 47, preferably circular and of any suitable material, such as paper, fabric, wire cloth, asbestos and the like, has a central hole which fits over the tube 39 and extends outwardly so as to cover the plate 41 and the bearing surface 32. The next filter frame is then placed on top of this filter sheet so that the latter is firmly pressed between the bearing surfaces 32 and 34 at the outside and between the bearing surface 29 and the perforated plate 41 at the inside.

One filter frame after another is thus added until the desired number of frames has been reached after which a top spider 48 is placed over the uppermost filter sheet, the tube 49 in this case being cut off at substantially the level of the filter sheet.

The spider 48 is secured in place by means of a central bolt 50 extending through the centers of the several hubs 37, through the central opening in the spider 25, and after passing through the fitting 17 and through a plug 51 in the fitting is secured by means of a nut 52.

The liquid to be filtered is usually mixed with some filter aid, such as infusorial earth, fuller's earth, and the like, which has the property of attaching itself to certain of the substances to be filtered out. Such a filter aid is mixed with the liquid to be filtered before it is passed through the pump 24. It then passes up between the walls of the tank and the filter units, the petcock 16 being opened, if necessary, so as to insure the tank being substantially filled with the liquid. Assisted by pressure from the pump 24 the liquid then passes inwardly through the openings 35 and thence through the filter sheets which catch and hold the infusorial earth together with certain impurities, thereby forming a filter cake 54, Fig. 1, above each of the filter sheets, while the filtered liquid passes through the several filter sheets and thence inwardly through the openings 40 in the hub and passes down through the fitting 17 and out through the pipe 20.

It will be observed that the imperforate plate 27 lies closely beneath the screen 41 but that it extends relatively well above the next lower filter sheet. Also the openings 35 are placed fairly high so as to insure the formation of a relatively thick filter cake. This arrangement permits the filter to be used intermittently without in any way disturbing the filter cake and it also forms a thicker and more uniform filter cake which gives a longer cycle to the filtering operation, and therefore a more uniform and higher quality of filtration.

In Fig. 3 is shown a modification of the apparatus in which special provision is made for filtering of the unfiltered residue remaining in the tank at the end of a run. In this form the lower spider is omitted and the lowermost filter plate unit 126 which is the same as the unit 26 of Figs. 1 and 2 is supported at its periphery on a ledge 114 within the casing 110, while the inner annular bearing surface 129 is supported on a ledge 160 on a casting 161 extending axially through the bottom of the casing and secured therein in any suitable manner as by welding. This casting has a central conical surface 162 adapted to tightly fit within the tube 142 which forms part of the tubular hub 137. This casting has a central opening 163 to which is connected a delivery pipe 120 for carrying off the filtered liquid from all filter units above the lowermost unit 126 in the same manner as does the pipe 20 for all the filter units of Fig. 1 and is controlled by a valve 122.

The casting 161 has an annular space 164 connecting at the top through openings 165 with the space 166 beneath the lowermost filter sheet 147 and at the bottom with a drain pipe 167 having a valve 168.

In operation, the valve 168 is closed and the valve 122 open during the regular filtering process which takes place in all the filter units above the lowermost filter sheet 147 but not through this filter sheet. As soon, however, as the last of the liquid to be filtered is fed to the tank, the valve 122 is closed and the valve 168 is opened. Pressure on the pipe 123 is applied by the pump as before and air is forced into the filter driving the liquid therein through the lowermost filter sheet 147 only, thereby filtering the residue which has heretofore often been lost because no good way had been devised to filter this relatively small amount of liquid.

Both forms permit of intermittent operation of the filter without disturbing the filter cake. The filter sheet always is horizontal and the space above it is ample thereby permitting building up a thicker filter cake which often fills the entire space above the filter sheet. Due to the construction of the apron and of the relatively small openings 35, there is no tendency of the filter cake to fall off into the residue liquid and there is therefore less waste. The filter cake is thus more uniform and the resulting filtering is more uniform and of better quality. The net result is simpler and faster cleaning and the filter itself is easily disassembled and cleaned.

I claim:

1. In a plate filter, a tank, a lid removably secured thereon, a series of horizontal filter frames, each comprising an imperforate plate having a peripheral apron extending beyond the plane of the plate on both sides thereof and having a series of holes therein for passage of a liquid to be filtered, each plate having a central opening and a flat annular ring surrounding the central opening to provide a bearing, and annular bearing surfaces formed at the upper and lower ends of the apron, a central perforate tubular hub bearing upon the annular ring, a perforate plate supported on the imperforate plate and on the central tubular hub the latter being extended above the perforated plate and operating to hold the same against horizontal movement, and a filter sheet supported on the perforate plate, the next filter frame having a liquid-tight bearing upon the filter sheet at its center and at its periphery.

2. In a plate filter, a tank, a lid removably secured thereon, a series of circular horizontal filter frames, each comprising an imperforate plate having a peripheral apron extending beyond the plane of the plate on both sides thereof and having a series of holes therein for passage of a liquid to be filtered, each plate having a central opening and a flat annular ring surrounding the central opening to provide a bearing, and annular bearing surfaces formed at the upper and lower ends of the apron, a central perforate tubular hub bearing upon the annular ring, a perforate plate supported on the imperforate plate and on the central tubular hub intermediate of the ends thereof, said hub operating to hold the perforated plate against horizontal movement, and a filter sheet supported on the perforate plate, the next filter frame having a liquid-tight bearing upon the filter sheet at its center and at its periphery.

3. In a plate filter, a tank, a lid removably secured thereon, a series of horizontal filter frames, each comprising an imperforate plate having a peripheral apron extending beyond the plane of the plate on both sides thereof and having a series of holes therein for passage of a liquid to be filtered, the holes being located high on the apron so as to permit the production of a relatively thick filter cake, each plate having a central opening and a flat annular ring surrounding the central opening to provide a bearing, and annular bearing surfaces formed at the upper and lower ends of the apron, a central perforate tubular hub bearing upon the annular ring and having at a point intermediate of its ends a shoulder of substantially the height of the apron, a perforate plate supported on the imperforate plate and on the central tubular hub, the latter being extended above the perforated plate and a filter sheet supported on the perforate plate, the next filter frame having a liquid-tight bearing upon the filter sheet at its center and at its periphery.

4. In a plate filter, a tank, a lid removably secured thereon, a series of filter frames, each comprising an imperforate plate having a peripheral apron extending beyond the plane of the plate on both sides thereof and having a series of holes therein for passage of a liquid to be filtered, there being a central opening and a flat annular ring surrounding the central opening to provide a liquid-tight bearing, and annular bearing portions formed at the upper and lower ends of the apron, a central perforate tubular hub bearing upon the annular ring and having a shoulder of substantially the height of the apron, a perforate plate supported on the imperforate plate and on the central tubular hub, a filter sheet supported on the perforate plate, the next filter frame having a liquid-tight bearing upon the filter sheet at its center and at its periphery, a main outlet for the liquid filtered through the series of filter frames and filter sheets and separate means within the tank and including an auxiliary outlet for filtering the residue remaining when the principal filtering operation is completed.

5. In a plate filter, a tank, a lid removably secured thereon, a series of filter frames, each comprising an imperforate plate having a peripheral apron extending beyond the plane of the plate on both sides thereof and having a series of holes therein for passage of a liquid to be filtered, there being a central opening and a flat annular ring surrounding the central opening to provide a liquid-tight bearing, and annular bearing portions formed at the upper and lower ends of the apron, a central perforate tubular hub bearing upon the annular ring and having a shoulder of substantially the height of the apron, a perforate plate supported on the imperforate plate and on the central tubular hub, a filter sheet supported on the perforate plate, the next filter frame having a liquid-tight bearing upon the filter sheet at its center and at its periphery, a separate filter unit near the bottom of the filter, and means for directing the residue from the principal filtering operation only through the separate filter unit to filter the residue.

6. In a filter, the combination with a tank of a plurality of superposed filter frames therewithin, each frame comprising an imperforate plate with walls extended therefrom to support upper and lower outer bearings in planes on opposite sides of the plane in which the plate is disposed and an apertured inner bearing in a plane which is coincident with the lower outer bearings, a hub adapted for fitting upon the inner bearing substantially in engagement with the supporting wall therefor, the hub being formed with a ledge at a point intermediate of its ends nearly in coincidence with the plane of the upper outer bearing, and a centrally apertured perforated plate through which the hub may extend to support upon its ledge the inner periphery thereof and at the same time projecting above the perforated plate, there being lateral openings through the hub and supporting walls of the imperforate plate, the frame so formed being adapted for superposition upon a like frame with the upper outer bearing and perforated plate of one resting against the lower outer and inner bearings, respectively, of the other.

7. In a filter, a tank, a series of superimposed filter units disposed in said tank, a bottom filter unit also disposed in said tank, a liquid inlet common to all of the filter units, an outlet for filtered liquid common to and extending through all of the filter units and communicating with said series of filter units, a separate outlet for filtered liquid individual to and communicating with said bottom filter unit, and selectively operable valve means for controlling the flow of liquid through said outlets for causing liquid to pass only through the series of filter units during a run and at the end of the run for causing the unfiltered residue to pass only through the bottom of the unit.

8. In a filter, a tank, an upper series of filter units disposed in said tank, a separate bottom filter unit also disposed in said tank, a liquid inlet common to all of the filter units, a main outlet for filtered liquid common to and communicating with only the upper series of filter units, a separate auxiliary outlet concentric with the main outlet and individual to and communicating with only the separate filter unit and selectively operable valve means for controlling the flow of liquid through outlets for causing liquid to pass only through the series of filter units during a run and at the end of the run for causing the unfiltered residue to pass only through the separate filter unit.

9. In a plate filter, a tank, a lid removably secured thereon, a series of horizontal filter frames, each comprising an imperforate plate having a peripheral apron extending beyond the plane of the plate on both sides thereof and having a series of holes therein for passage of a liquid to be filtered, each plate having a central opening, a flat annular ring surrounding the central opening to provide a bearing, and annular bearing surfaces formed at the upper and lower ends of the apron, a central perforate tubular hub adjacent the annular ring, a perforate plate supported on the imperforate plate and on the central tubular hub, the latter being extended above the perforated plate and operating to hold the same against horizontal movement, and a filter sheet supported on the perforate plate, the next filter frame having a liquid-tight bearing upon the filter sheet at its center and at its periphery.

10. In a plate filter, a tank, a lid removably secured thereon, a series of horizontal filter frames, each comprising an imperforate plate having a peripheral apron extending beyond the plane of the plate on both sides thereof and having a series of holes therein for passage of a liquid to be filtered, the holes being located high on the apron so as to permit the production of a relatively thick filter cake, each plate having a central opening, a flat annular ring surrounding the central opening to provide a bearing, and annular bearing surfaces formed at the upper and lower ends of the apron, a central perforate tubular hub adjacent the annular ring and having at a point intermediate of its ends a shoulder of substantially the height of the apron, a perforate plate supported on the imperforate plate and on the central tubular hub, the latter being extended above the perforated plate, and a filter sheet supported on the perforate plate, the next filter frame having a liquid-tight bearing upon the filter sheet at its center and at its periphery.

ALOYSIUS C. KRACKLAUER.